United States Patent

Kurbayashi et al.

[11] Patent Number: 5,700,314
[45] Date of Patent: Dec. 23, 1997

[54] IMAGE FORMING METHOD, AND INK SET AND INK-JET MACHINERY USED THEREIN

[75] Inventors: Yutaka Kurbayashi, Tokorozawa; Katsuhiro Shirota, Inagi; Katsuhiko Takahashi, Yokohama, all of Japan

[73] Assignee: Canon Kabushiki Kaisha, Tokyo, Japan

[21] Appl. No.: 411,963

[22] Filed: Mar. 28, 1995

[30] Foreign Application Priority Data

Mar. 30, 1994 [JP] Japan .................... 6-060915

[51] Int. Cl.⁶ .................................. C09D 11/02
[52] U.S. Cl. ...................... 106/31.27; 106/31.51
[58] Field of Search ............... 106/22 R, 20 D, 106/31.27, 31.51

[56] References Cited

U.S. PATENT DOCUMENTS

| | | | |
|---|---|---|---|
| 4,864,324 | 9/1989 | Shirota et al. | 364/1.1 |
| 5,074,914 | 12/1991 | Shirota et al. | 106/22 |
| 5,110,356 | 5/1992 | Shirota et al. | 106/22 |
| 5,118,351 | 6/1992 | Shirota et al. | 106/22 |
| 5,123,960 | 6/1992 | Shirota et al. | 106/22 |
| 5,135,570 | 8/1992 | Eida et al. | 106/22 |
| 5,135,571 | 8/1992 | Shirota et al. | 106/22 |
| 5,139,573 | 8/1992 | Yamamoto et al. | 106/22 |
| 5,141,558 | 8/1992 | Shirota et al. | 106/22 |
| 5,151,128 | 9/1992 | Fukushima et al. | 106/20 |
| 5,190,581 | 3/1993 | Fukushima et al. | 106/20 D |
| 5,216,437 | 6/1993 | Yamamoto et al. | 346/1.1 |
| 5,220,347 | 6/1993 | Fukushima et al. | 346/1.1 |
| 5,221,333 | 6/1993 | Shirota et al. | 106/20 D |
| 5,231,417 | 7/1993 | Shirota et al. | 346/1.1 |
| 5,248,991 | 9/1993 | Shirota et al. | 346/1.1 |
| 5,250,121 | 10/1993 | Yamamoto et al. | 106/22 R |
| 5,254,157 | 10/1993 | Koike et al. | 106/20 D |
| 5,258,066 | 11/1993 | Kobayashi et al. | 106/22 R |
| 5,296,022 | 3/1994 | Kobayashi et al. | 106/20 D |
| 5,329,305 | 7/1994 | Fukushima et al. | 347/95 |
| 5,358,558 | 10/1994 | Yamamoto et al. | 106/22 R |

FOREIGN PATENT DOCUMENTS

| | | |
|---|---|---|
| 0224909A3 | 6/1987 | European Pat. Off. . |
| 0661168A2 | 7/1995 | European Pat. Off. . |
| 55-65269 | 5/1980 | Japan . |
| 55-66976 | 5/1980 | Japan . |
| 61-59911 | 12/1986 | Japan . |
| 61-59912 | 12/1986 | Japan . |
| 61-59914 | 12/1986 | Japan . |
| 63-299971 | 12/1988 | Japan . |
| 64-9279 | 1/1989 | Japan . |
| 64-63185 | 3/1989 | Japan . |

OTHER PUBLICATIONS

English translation of JP63/2999/1, Dec. 1988.
Derwent Publications (Database WPI) AN 94-164184, Week 9420 with respect to JP 6-107,988 of Apr. 1984.

*Primary Examiner*—Helene Klemanski
*Attorney, Agent, or Firm*—Fitzpatrick, Cella, Harper & Scinto

[57] ABSTRACT

An ink set comprising a combination of a liquid composition containing a cationic substance, with a yellow ink, a cyan ink and magenta ink, wherein said three inks each contain a water soluble anionic dye and are capable of affording a chromaticity CIE L*a*b* to a black image presented on a recording medium by using these inks in combination within the range of the numerical expressions:

$$10 \leq L^* \leq 30,$$

$$0 \leq a^* \leq 7,$$

and $$-10 \leq b^* \leq 0.$$

30 Claims, 3 Drawing Sheets

FIG. 6

IMAGE FORMING METHOD, AND INK SET AND INK-JET MACHINERY USED THEREIN

BACKGROUND OF THE INVENTION

1. Field of the Invention

This invention relates to an image forming method, and an ink set and ink-jet machinery that are used therein.

2. Related Background Art

Ink-jet recording is a process of making a record by causing minute droplets of ink to fly and adhere to a recording medium such as paper. In particular, methods as disclosed in Japanese Patent Publications No. 61-59911, No. 61-59912 and No. 61-59914 in which heat energy is imparted to ink by using an electrothermal transducer as an ejection energy feeding means, enable easy materialization of higher-density multi-orifice recording heads, and hence images with a high resolution and a high quality can be recorded at a high speed.

However, inks conventionally used in ink-jet recording are commonly mainly composed of water, to which water-soluble high-boiling solvents such as glycol are added for the purposes of, e.g., preventing inks from drying and preventing orifices from clogging. When a record is made on plain paper using such ink, insufficient fixing performance may be attained, or uneven images may occur which are presumed to be due to uneven distribution of fillers and sizing agents on the surface of recording paper. Especially when color images are to be obtained, a plurality of color inks are successively superimposed on paper before they become fixed, and hence colors may blur or unevenly mix at boundaries between images with different color inks (this phenomenon is hereinafter called bleeding) to make it difficult to obtain satisfactory images.

As a means for improving fixing performance, Japanese Patent Application Laid-open No. 55-65269 discloses adding to ink a compound capable of increasing its permeation. Japanese Patent Application Laid-open No. 55-66976 also discloses use of an ink mainly composed of a volatile solvent. In the former method, although fixing performance and bleeding can be improved and prevented to a certain extent as a result of the increase in ink permeation into recording paper, coloring materials also permeate into the recording paper to a great depth together with ink to cause inconveniences such as a lowering of image density and chroma and also cause a spread of ink in the lateral direction, which consequently may also cause the problems of a decrease in edge sharpness and a lowering of resolution. As for the latter, in addition to the inconveniences occurring in the former, clogging due to evaporation of solvents undesirably tends to occur at nozzles of the recording head.

To overcome such problems, methods are also disclosed in which a liquid that enables formation of good images is made to adhere to the recording medium before the ejection of recording ink.

For example, Japanese Patent Application Laid-open No. 63-299971 discloses a method in which a liquid containing an organic compound having at least two cationic groups per molecule is made to adhere to the recording medium and thereafter the recording is carried out using an ink containing an anionic dye. Japanese Patent Application Laid-open No. 64-9279 also discloses a method in which an acidic liquid containing succinic acid or the like is made to adhere and thereafter the recording is carried out using an ink containing an anionic dye.

Japanese Patent Application Laid-open No. 64-63185 also discloses a method in which a liquid that can make dyes insoluble is imparted before the ink is imparted to carry out recording.

All the above methods, however, rely on the deposition of dyes themselves in order to prevent the bleeding of images or improve the water resistance thereof, and have the problems that aggregates of dyes cause a great decrease in coloring properties because of the insolubilization of dyes.

Especially when black inks which contain a water-soluble black dye are used in such image forming methods, the decrease in coloring properties which is due to agglomeration of dyes causes a phenomenon called bronzing, a phenomenon in which the printed areas that must be originally black colored are reddish, which greatly affects the quality of prints.

The bronzing tends to occur also in the case of process black formed by mixture of the three colors yellow, cyan and magenta.

SUMMARY OF THE INVENTION

Accordingly, taking account of the existing circumstances in the prior art techniques, an object of the present invention is to settle the following four technical subjects.

That is, it is a main object of the present invention, in ink-jet recording carried out on what is called plain paper used as a recording medium:

(1) to achieve good character quality level while enjoying a good fixing performance;

(2) to obtain a sufficient image density and make solid prints have a high uniformity;

(3) to obtain good black-colored prints without causing the bronzing; and (4) to perfect the water resistance of recorded images.

The above objects of the present invention can be achieved by the invention described below.

The present invention provides an ink set comprising a combination of a liquid composition containing a cationic substance, with a yellow ink, a cyan ink and a magenta ink, wherein:

the three inks each contain a water-soluble anionic dye and are capable of affording a chromaticity CIE L*a*b* to a black image presented on a recording medium by using these inks in combination within the range of the numerical expressions:

$10 \leq L^* \leq 30$, $0 \leq a^* \leq 7$, and $-10 \leq b^* \leq 0$.

The present invention also provides an image forming method comprising forming a black portion by using a liquid composition containing a cationic substance, in combination with a yellow ink, a cyan ink and a magenta ink, wherein;

the three inks each contain a water-soluble anionic dye and are capable of affording a chromaticity CIE L*a*b* to a black image presented on a recording medium by using these inks in combination within the range of the numerical expressions:

$10 \leq L^* \leq 30$, $0 \leq a^* \leq 7$, and $$-10 \leq b^* \leq 0.$$

The present invention still provides an image forming method comprising imparting a liquid composition, a yellow ink, a cyan ink and a magenta ink by an ink-jet system to record a black portion, wherein the ink set described above is applied.

The present invention still also provides a recording unit comprising holders for a liquid composition and an ink and a head for ejecting the liquid composition and the ink in the form of droplets, wherein the ink set described above is applied.

The present invention further provides an ink cartridge comprising holders for a liquid composition and an ink, wherein the ink set described above is applied.

The present invention still further provides an ink-jet recording apparatus comprising the recording unit described above.

The present invention still further provides an ink-jet recording apparatus comprising the ink cartridge described above.

The present invention still further provides an image which is presented using a liquid composition containing a cationic substance, in combination with a yellow ink, a cyan ink and a magenta ink, and contains a black portion having on a recording medium a chromaticity CIE L*a*b* within the range of the numerical expressions:

$$10 \leq L^* \leq 30,$$

$$0 \leq a^* \leq 7,$$

and $$-10 \leq b^* \leq 0.$$

DESCRIPTION OF THE PREFERRED EMBODIMENTS

How the present invention operates will be described below.

In the present invention, the liquid composition and inks mentioned above are mixed at the part where they have permeated into a recording paper. As a result, the cationic substance and the anionic groups contained in the inks electrostatically combine to cause instantaneous aggregation, and the dye components and solvent components in the inks become separate (hereinafter this phenomenon is called solid-liquid separation), so that only the solvent components permeate into the recording paper and hence the coloring material, dye components, cause no bleeding.

The solid-liquid separation explained above more efficiently takes place when the liquid composition contains as the cationic substance a component with a molecular weight of 1,000 or less and a component with a molecular weight of 1,500 or more. The molecular weight referred to in the present invention means a number average molecular weight, which is measured by methods such as GPC (gel permeation chromatography).

The detailed mechanism is unclear as to the reason why the solid-liquid separation more efficiently takes place when the two kinds of cationic substances are present in the liquid composition. Stated generally, it can be explained as follows.

First, as the first stage of the reaction, the low-molecular weight component of the cationic substance contained in the liquid composition and the water-soluble dye having anionic groups used in the ink ionically act on each other to cause association, which causes instantaneous separation from the liquid phase.

Next, as the second stage of the reaction, the product of the above association between the dye and the low-molecular weight cationic substances is adsorbed by the high-molecular weight component and hence the size of dye aggregates produced upon the association further increases, so that they become difficult to enter into the gaps between fibers of the recording paper. As the result, only the liquid having undergone solid-liquid separation permeates into the recording paper and hence both the character quality level and the fixing performance can be achieved.

At the same time, the aggregates formed of the low-molecular weight component, the anionic dye and the cationic substance, produced by the mechanism as explained above, come to have a large viscosity and do not move with the movement of the liquid medium. Hence, no edge sharpness of characters or images is damaged even when the fixing is accelerated as in the prior art, and a good character quality level can be obtained. The above aggregates are also substantially water-insoluble and hence the water resistance of the images formed becomes perfect.

In the present invention, it is presumed that the aggregates may cause crystallization on the recording paper, where, especially when the ink is black, the prints may have a reddish color tone and can not become black depending on differences in the concentration of dyes in the ink, the type of dyes, the quantity of ink ejected and the type of paper. This phenomenon has been similarly questioned also in the case of a process where black is formed by mixture of yellow, cyan and magenta.

Now, when black images are formed by mixture of the three colors yellow, cyan and magenta, the present inventors have employed the means shown below in three points.

(1) The combination of water-soluble anionic dyes used in the yellow, cyan and magenta inks is optimized.

(2) The proportion of ink shot for the yellow, cyan and magenta inks is controlled when black images are formed.

(3) An anionic surface active agent or anionic high-molecular weight substance is added to at least one of the yellow, cyan and magenta inks.

As the result, they have found that good black images having on the recording medium a chromaticity CIE L*a*b* within the range of the numerical expressions:

$$10 \leq L^* \leq 30,$$

$$0 \leq a^* \leq 7,$$

and $$-10 \leq b^* \leq 0$$

can be obtained, and have accomplished the present invention.

The present invention will be described below in greater detail by giving preferred embodiments of the present invention.

The liquid composition will be first described.

The essential component to be contained in the liquid composition referred to in the present invention is the cationic substance. The function of the cationic substance in the present invention is to electrostatically combine with the water-soluble anionic dye contained in ink, described later, to form aggregates. As a more preferred embodiment in the working of the present invention, the cationic substance comprises the following two components as mentioned above.

(1) A low-molecular weight cationic substance with a molecular weight of 1,000 or less.

(2) A high-molecular weight cationic substance with a molecular weight of from 1,500 to 10,000.

The essential component that constitutes the inks described in the present invention is;

(3) a water-soluble anionic dye having one or more anionic groups.

Specific examples of the component (1) low-molecular weight cationic substance with a molecular weight of 1,000 or less are shown below.

Primary, secondary and tertiary amine salt compounds, specifically including hydrochlorides or acetates of lauryl amine, coconut amine, stearyl amine and rosin amine; quaternary ammonium salt compounds specifically including lauryltrimethylammonium chloride, lauryldimethylbenzylammonium chloride, benzyltributylammonium chloride and benzalkonium chloride; pyridinium salt compounds specifically including cetylpyridinium chloride and cetylpyridinium bromide; imidazoline type cationic compounds specifically including 2-butadecenyl-hydroxyethylimidazoline; and ethylene oxide addition products of higher alkylamines, specifically including hydroxyethylstearylamine. In the present invention, amphoteric surface active agents having cationic properties in a certain pH range can also be used. They may more specifically include amino acid type amphoteric surface active agents, and carboxylate type amphoteric surface active agents such as R—NH—CH$_2$—CH$_2$—COOH type compounds and betaine type compounds, specifically including stearyldimethylbetaine and lauryldihydroxyethylbetaine, as well as sulfuric ester type, sulfonic acid type and phosphoric ester type amphoteric surface active agents. Of course, when these amphoteric surface active agents are used, the liquid composition must be prepared so as to have a pH not higher than their isoelectric points, or must be adjusted so as to have a pH not higher than the isoelectric points upon its mixture with inks on the recording medium, either means of which may be taken.

The low-molecular weight cationic compounds are as exemplified above. Needless to say, the compounds that can be used in the present invention are by no means limited to these.

As other examples of the component (1), monomers or oligomers of the cationic high-molecular weight component described later may also be used.

Examples of the low-molecular weight cationic substance with a molecular weight of 1,000 or less are as shown above. In the present invention, those having a molecular weight ranging from 100 to 700 are particularly preferred in view of the advantages that they have surface activities, cause rapid reaction with dyes and contribute an improvement in edge sharpness of images.

The component (2) high-molecular weight substance with a molecular weight of from 1,500 to 10,000 also has the operation and effect in the present invention as described above, i.e., as the second stage of the reaction of inks with the liquid composition, it adsorbs in its molecule the product of the association between the dye and the low-molecular weight components of the cationic substances to further increase the size of dye aggregates produced upon the association, and to make them difficult to enter into the gaps between fibers of the recording paper, so that only the liquid having undergone solid-liquid separation permeates into the recording paper and hence both the character quality level and the fixing performance can be achieved. Such a cationic high-molecular weight substance may include, for example, polyallylamine hydrochloride, polyamine sulfone hydrochloride, polyvinylamine hydrochloride, and chitosan acetate. Of course, examples are by no means limited to these. Examples are also by no means limited to hydrochloride types and acetate types.

As other examples, compounds obtained by partly cationizing nonionic high-molecular weight substances may also be used.

They may specifically include copolymers of vinyl pyrrolidone with aminoalkylalkylate quaternary salts and copolymers of acrylamide with aminomethyl acrylamide quaternary salts. Needless to say, examples are by no means limited to these.

The high-molecular weight substances and cationic high-molecular weight substances described above are satisfactory if they are water-soluble, and may also be in the form of dispersions such as latexes and emulsions.

These cationic high-molecular weight substances may have a molecular weight of from 1,500 to 10,000, and such compounds are preferred in view of the working of the present invention. They may more preferably be compounds having a molecular weight of from 1,500 to 7,000, which are more preferred in view of the advantage that they cause no lowering of coloring properties of dyes. They also have the advantage that the ejection performance of the liquid composition can be well maintained because, when the liquid composition is applied to a recording medium by means of an ink-jet recording head, a compound having a molecular weight on the lower molecular weight side can maintain a lower solution viscosity even when used in a larger content.

The molecular weight referred to in the above is meant to be a molecular weight in terms of polyethylene oxide, which is measured by analytical methods as exemplified by GPC (gel permeation chromatography).

These components contained in the liquid composition may preferably be in an amount ranging from 0.05 to 20% by weight on the basis of weight. An optimum range must be determined according to the combination of the respective substances used.

Other components that constitute the liquid composition will be specifically described below. In addition to the components (1) and (2) described above, the liquid composition may usually comprise water, a water-soluble organic solvent and other additives.

The water-soluble organic solvent may include amides such as dimethylformamide and dimethylacetamide; ketones such as acetone; ethers such as tetrahydrofuran and dioxane; polyalkylene glycols such as polyethylene glycol and polypropylene glycol; alkylene glycols such as ethylene glycol, propylene glycol, butylene glycol, triethylene glycol, hexylene glycol and diethylene glycol; 1,2,6-hexanetriol, thiodiglycol; lower alkyl ethers of polyhydric alcohols, such as ethylene glycol methyl ether, diethylene glycol monomethyl ether and triethylene glycol monomethyl ether; and monohydric alcohols such as ethanol, isopropyl alcohol, n-butyl alcohol and isobutyl alcohol; as well as glycerol, N-methyl-2-pyrrolidone, 1,3-dimethyl-2-imidazolidinone, triethanolamine, sulforane, and dimethylsulfoxide; any of which may be used. There are no particular limitations on the content of the water-soluble organic solvent, which may preferably be in the range of from 1 to 60% by weight, and more preferably from 5 to 30% by weight. If necessary, additives such as a viscosity modifier, a pH adjuster, an antiseptic, a surface active agent, an antioxidant and an evaporation accelerator may also be added. The selection of surface active agents is especially important in order to adjust the permeation of liquid.

The liquid composition as described in the present invention can be used so long as it has such a color tone that may cause no change in the color tone of recording ink. As its physical properties, it may preferably have a pH ranging from 3 to 12, a surface tension of from 10 to 60 dyne/cm and a viscosity ranging from 1 to 30 cP, at around 25° C.

Recording inks used in the present invention will be described below.

The recording inks used in the present invention each comprise the water-soluble anionic dye having one or more anionic groups as described above, water, a water-soluble organic solvent and other components as exemplified by a viscosity modifier, a pH adjuster, an antiseptic, a surface active agent, an antioxidant and so forth.

The water-soluble anionic dye having one or more anionic groups, used in the present invention, may be any of the water-soluble acid dyes, direct dyes and reactive dyes listed in COLOR INDEX, without any particular limitations. Those not listed in COLOR INDEX may also be used without any particular limitations so long as they have one or more anionic groups, e.g., a sulfonic group or a carboxyl group. The water-soluble anionic dye herein referred to also includes of course those having a dependence of solubility on pH.

Water-soluble cyan dyes having one or more anionic groups, used in the present invention, may be any of the water-soluble acid dyes, direct dyes and reactive dyes listed in COLOR INDEX, without any particular limitations.

For example, C.I. Acid Blue 1, 7, 9, 23, 103, 132, 142, 230, 239, 258 and 280, C.I. Direct Blue 78, 86, 189, 199, 225 and 273, C.I. Reactive Blue 2, 14, 18, 21, 25, 38, 41, 63, 72, 140, 207, 227 and 231, and so forth may be used. Examples are by no means limited to these.

Those not listed in COLOR INDEX may also be used without any particular problems so long as they have an anionic group, e.g., a sulfonic group or a carboxyl group.

With respect to yellow dyes, similar to cyan dyes any water-soluble anionic dyes having one or more anionic groups can be used without any particular problems.

They can be specifically exemplified by C.I. Direct Yellow 86, 142 and 144, C.I. Acid Yellow 11, 17, 23, 25, 38, 44, 49, 61, 72, 110, 127, 158 and 176, and so forth. Examples are by no means limited to these.

In respect of magenta dyes, similarly any water-soluble anionic dyes having one or more anionic groups can be used without any particular problems.

They can be specifically the water-soluble acid dyes, direct dyes and reactive dyes listed in COLOR INDEX, as exemplified by C.I. Acid Red 6, 8, 35, 37, 52, 92, 133 and 289 and so forth, and also a dye represented by the formula wherein $R_1$, $R_2$ and $R_3$ each represent a functional group shown below.

$R_1$ and $R_2$: H, $CH_3$, $OCH_3$, $-SO_3M$ or $-COOM$.
$R_3$: $-COCH_3$, wherein $R_4$ and $R_5$ each represent $-COOM$, $R_6$ or $-OR_6$, where $R_6$ represents a $C_2$ to $C_6$ alkyl chain which may be branched; and M represents sodium, lithium, an organic amine or ammonium.

There are no particular limitations on the content of the dye in the ink of the present invention, which may usually be from 0.1 to 15% by weight, preferably from 0.5 to 10% by weight, and more preferably from 0.5 to 6% by weight, based on the total weight of the ink. The dye may be used alone or in combination.

The medium suitable for use in the inks of the present invention is water or a mixed solvent of water and a water-soluble organic solvent. As the water, it is preferable not to use ordinary tap water containing various ions but deionized water.

The water-soluble organic solvent used by mixture with water may include, for example, alkyl alcohols having 1 to 5 carbon atoms such as methyl alcohol, ethyl alcohol, n-propyl alcohol, isopropyl alcohol, n-butyl alcohol, sec-butyl alcohol, tert-butyl alcohol, isobutyl alcohol and n-pentanol; amides such as dimethylformamide and dimethylacetamide; ketones or ketoalcohols such as acetone and diacetone alcohol; ethers such as dioxane; polyalkylene glycols such as polyethylene glycol and polypropylene glycol; alkylene glycols the alkylene group of which has 2 to 6 carbon atoms, such as ethylene glycol, propylene glycol, butylene glycol, triethylene glycol, hexylene glycol and diethylene glycol; 1,2,6-hexanetriol, thiodiglycol; glycerol; lower alkyl ethers of polyhydric alcohols, such as ethylene glycol monomethyl ether, ethylene glycol monoethyl ether, diethylene glycol monomethyl ether, diethylene glycol monoethyl ether, triethylene glycol monomethyl ether and triethylene glycol monoethyl ether; lower dialkyl ethers of polyhydric alcohols, such as triethylene glycol dimethyl ether, triethylene glycol diethyl ether, tetraethylene glycol dimethyl ether, tetraethylene glycol dimethyl ether and tetraethylene glycol diethyl ether; sulforane, N-methyl-2-pyrrolidone, and 1,3-dimethyl-2-imidazolidinone.

The solvents in the inks of the present invention are used under selection of suitable ones from the above organic solvents. In the case of the inks of the present invention, diethylene glycol or thiodiglycol is preferred from the viewpoint of the prevention of clogging of nozzles with inks.

From the viewpoint of frequency response, use of lower alcohols or surface active agents is preferred.

Thus, as solvent composition preferable in the inks of the present invention, the solvent may comprise, in addition to the water, the various components as described above.

In the inks of the present invention, the water-soluble organic solvent in each ink may be usually in a content of from 2 to 80% by weight, preferably from 3 to 70% by weight, and more preferably from 4 to 60% by weight, based on the total weight of the ink.

In the inks of the present invention, the water in each ink may be usually in a content of from 10 to 97.5% by weight, preferably from 35 to 97.5% by weight, and more preferably from 45 to 97.5% by weight, based on the total weight of the ink. If the amount of water in the ink is less than 10% by weight, a low-volatile organic solvent may remain in a large quantity in the recorded images formed, to give a possibility of causing the problems of migration of dyes and bleeding of images.

The inks of the present invention may optionally contain, in addition to the components described above, pH adjusters, viscosity modifiers, surface tension modifiers. The pH adjusters may include various organic amines such as diethanolamine and triethanolamine, and inorganic alkali agents formed of alkali metal hydroxides such as sodium hydroxide, lithium hydroxide and potassium hydroxide.

The inks of the present invention may have a viscosity of from 1 to 20 cP, and preferably from 1 to 15 cP, a surface tension of 15 dyne/cm or above, and preferably 25 dyne/cm or above, and a pH of about 6 to 10, at 25° C., respectively.

In order to more effectively carry out the present invention, anionic surface active agents or anionic high-molecular weight substances may be added to the inks in addition to the components described above. The amphoteric surface active agents previously described may also be used, adjusting the pH so as to be higher than their isoelectric points. Examples of such anionic surface active agents are commonly available carboxylate type, sulfuric ester type, sulfonic acid type and phosphoric ester type ones, any of which can be used without problems.

Examples of the anionic high-molecular weight substances are alkali-soluble type resins, specifically including sodium polyacrylate or those obtained by copolymerizing acrylic acid on part of high molecular weight molecules. Of course, examples are not limited to these.

There are no particular limitations on the recording medium used when the present invention is carried out. What is called plain paper such as copy paper and bond paper conventionally used can be preferably used. Of course, coated papers specially prepared for ink-jet recording or OHP transparent films can also be preferably used. Usual woodfree paper and glossy paper can also preferably be used.

In a preferred embodiment of the image forming method of the present invention, the liquid composition described above is adhered to an image forming area, or an image forming area and in the vicinity thereof, of the recording medium prior to an ink, and thereafter the ink is adhered to that area. Herein the image forming area is meant to be the area to which ink dots adhere, and the vicinity of the image forming area is meant to be the area distant by 1 dot to 5 dots from the periphery of the area to which ink dots adhere.

As methods to adhere the liquid composition to the recording medium, one may contemplate spraying or use of a roller, by which the liquid composition is made to adhere to the whole surface of the recording medium. However, ink-jet systems are preferred which can adhere ink uniformly to only an image forming area to which the ink should adhere and in the vicinity of the image forming area. There are no particular limitations on the time after the liquid composition has been adhered to the recording medium and before the ink is adhered thereto.

As stated above, various ink-jet systems may be used as methods to adhere the liquid composition and the ink to the recording medium. It is particularly preferable to use a system of ejecting ink droplets by the aid of bubbles produced by heat energy.

How to form the black image by mixture of yellow ink, cyan ink and magenta ink (hereinafter "process black") will be described below.

In the present invention, a preferred means for bringing the chromaticity CIE $L^*a^*b^*$ of the process black on the recording medium into the range of $10 \leq L^* \leq 30$, $0 \leq a^* \leq 7$ and $-10 \leq b^* \leq 0$ is exemplified by the following three points.

(1) The combination of water-soluble anionic dyes used in the yellow, cyan and magenta inks is optimized.

(2) The proportion of ink shot for the yellow, cyan and magenta inks is controlled when black images are formed.

(3) The anionic surface active agent or anionic high-molecular weight substance is added to at least one of the yellow, cyan and magenta inks.

Operation for the three points as stated above makes it possible to prevent the bronzing that is a problem in the process black formed by mixture of yellow, cyan and magenta inks and to obtain good black images having on the recording medium a chromaticity CIE $L^*a^*b^*$ within the above ranges.

With regard to the above item (2), the following two methods can be employed.

(2-a) In forming a black image, the ink shot duty of magenta ink is controlled to be 50 to 80% of the ink shot duties of other two color inks.

(2-b) In forming a black image, the quantity of yellow ink and cyan ink each to be imparted to the recording medium is increased by 10 to 50% with respect to that of magenta ink.

As methods for relatively increasing the amount of inks to be imparted can be exemplified by methods of, e.g., raising temperature-conditioning temperature of the recording head, and increasing the energy applied to the head by changing pulse width, voltage and so forth.

Figure 1:
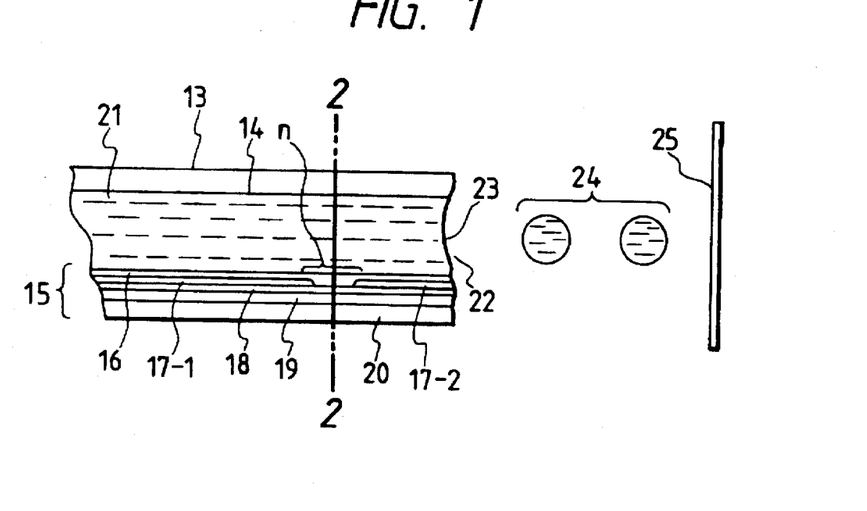
FIG. 1 illustrates a longitudinal cross section of a head assembly of an ink-jet recording apparatus.
Figure 2:
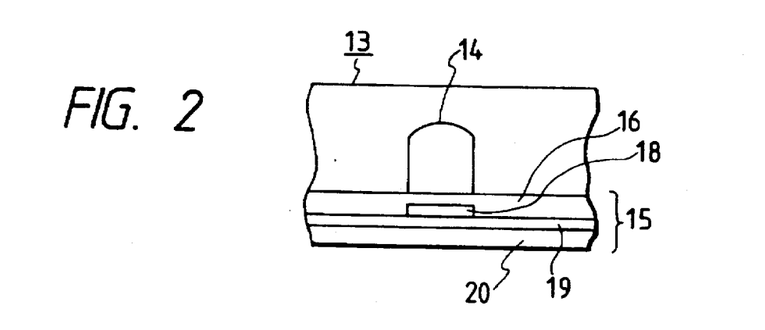
FIG. 2 is a transverse cross section of the head assembly of an ink-jet recording apparatus.
Figure 3:
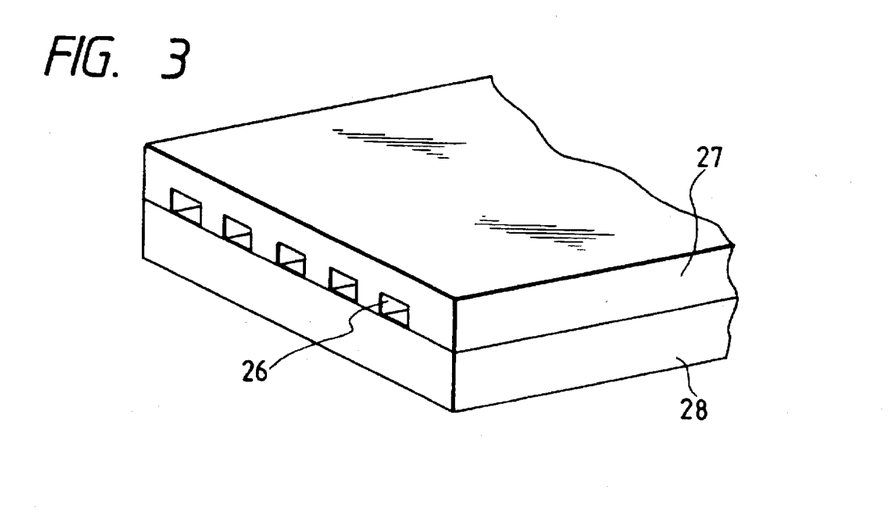
FIG. 3 is a perspective illustration of the appearance of another head assembly of an ink-jet recording apparatus.

An example of the ink-jet recording apparatus preferable in the ink-jet recording carried out using the inks of the present invention will be described below. FIGS. 1, 2 and 3 show examples of the construction of the recording head, which is a main component of the apparatus.

A head 13 is formed by bonding a glass, ceramic or plastic plate or the like provided with an ink flow path 14, to a heating head 15 used in thermal recording (the drawing shows a head, to which, however, the invention is not limited). The heating head 15 is comprised of a protective film 16 formed of silicon oxide or the like, aluminum electrodes 17-1 and 17-2, a heating resistor layer 18 formed of nichrome or the like, a heat accumulating layer 19, and a substrate 20 with good heat dissipation properties, made of alumina or the like.

The ink 21 reaches an ejection orifice (minute opening) 22 and a meniscus 23 is formed there by a pressure P.

Now, upon application of electric signals to the electrodes 17-1 and 17-2, heat is abruptly generated at the region denoted by n in the thermal head 15, so that bubbles are generated in the ink 21 coming into contact with this region. The pressure thus produced thrusts out the meniscus 23 and the ink 21 is ejected from the orifice 22 in the form of minute recording drops 24 to fly against a recording medium 25. FIG. 3 schematically illustrates a multi-head comprising the head as shown in FIG. 1 arranged in a large number. This multi-head is prepared by closely bonding a glass plate 27 having multiple grooves 26, to a heating head 28 similar to the head as illustrated in FIG. 1.

FIG. 1 is a cross-sectional view of the head 13 along its ink flow path, and FIG. 2 is a cross-sectional view along the line 2—2 in FIG. 1.

Figure 4:
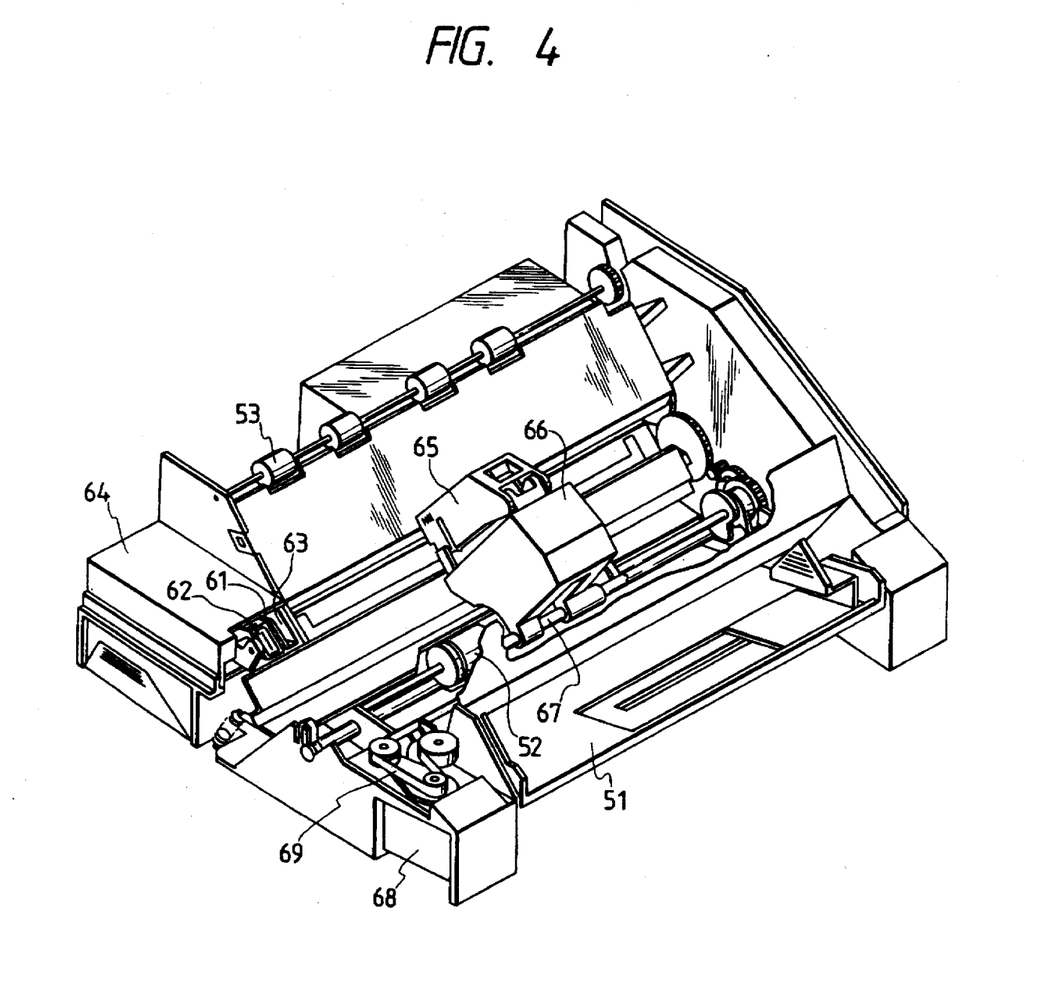
FIG. 4 is a perspective illustration of an example of an ink-jet recording apparatus.

FIG. 4 shows an example of the ink-jet recording apparatus in which such a head has been incorporated. In FIG. 4, reference numeral 61 denotes a blade serving as a wiping member in the form of a cantilever, one end of which is a stationary end retained by a blade-retaining member. The blade 61 is provided at the position adjacent to the region in which a recording head makes a record. In the present example, the blade is retained in such a form that it projects to the course through which the recording head is moved. Reference numeral 62 denotes a cap, which is provided at the home position adjacent to the blade 61, and is so constituted that it moves in the direction perpendicular to the direction in which the recording head is moved and comes into contact with the face of ejection openings to carry out capping. Reference numeral 63 denotes an ink absorber provided adjoiningly to the blade 61, and, similar to the blade 61, is retained in such a form that it projects to the course through which the recording head is moved.

The above blade 61, cap 62 and absorber 63 constitute an ejection restoration assembly 64, where the blade 61 and the absorber 63 remove the water, dust or the like from the ink ejection opening face.

Reference numeral 65 denotes the recording head having an ejection energy generating means and ejects ink to the recording medium set opposite to the ejection opening face provided with ejection openings, to carry out recording. Reference numeral 66 denotes a carriage on which the recording head 65 is mounted so that the recording head 65 can be moved. The carriage 66 is slidably associated with a guide shaft 67. Part of the carriage 66 is connected (not shown) with a belt 69 driven by a motor 68. Thus, the carriage 66 can be moved along the guide 67 and hence the recording head 65 can be moved from a recording region to a region adjacent thereto.

Reference numeral 51 denotes a paper feeding part from which recording mediums are inserted, and 52, a paper feed roller driven by a motor (not shown). With such construction, the recording medium is fed to the position opposing to the ejection opening face of the recording head, and, with progress of recording, outputted from a paper output section provided with a paper output roller 53.

In the above constitution, the cap 62 of the head restoration assembly 64 is receded from the moving course of the recording head 65 when the recording head 65 is returned to its home position, e.g., after completion of recording, and the blade 61 stands projected to the moving course. As a result, the ejection opening face of the recording head 65 is wiped. When the cap 62 comes into contact with the ejection opening face of the recording head 65 to carry out capping, the cap 62 is moved in such a way that it projects to the moving course of the recording head.

When the recording head 65 is moved from its home position to the position at which recording is started, the cap 62 and the blade 61 are at the same position as the position where the ejection opening face is wiped. As a result, the ejection opening face of the recording head 65 is wiped also at the time of this movement.

The above movement of the recording head to its home position is made not only at the time of the completion of recording or restoration of ejection, but also when the recording head is moved between recording regions for the purpose of recording, during which it is moved to the home position adjacent to each recording region at given intervals, where the ejection opening face is wiped in accordance with this movement.

Figure 5:
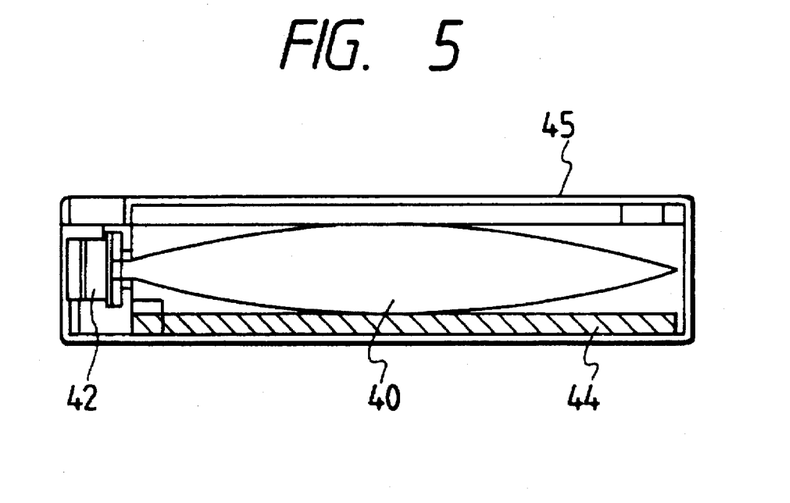
FIG. 5 is a vertical cross-sectional illustration of an ink cartridge.

FIG. 5 shows an example of an ink cartridge, denoted as 45, that has held the ink being fed to the head through an ink-feeding tube. Herein reference numeral 40 denotes an ink holder, e.g., an ink bag, that has held the feeding ink. The top thereof is provided with a stopper 42 made of rubber. A needle (not shown) may be inserted to this stopper 42 so that the ink in the ink holder 40 can be fed to the head. Reference numeral 44 denotes an absorber that receives a waste ink. In the present invention, it is preferable for the ink holder to be formed of a polyolefin, especially polyethylene, at its face coming into contact with ink. The ink-jet recording apparatus used in the present invention is not limited to the apparatus as described above in which the head and the ink cartridge are separately provided, and a device can also be preferably used in which these are integrally formed as shown in FIG. 6.

Figure 6:
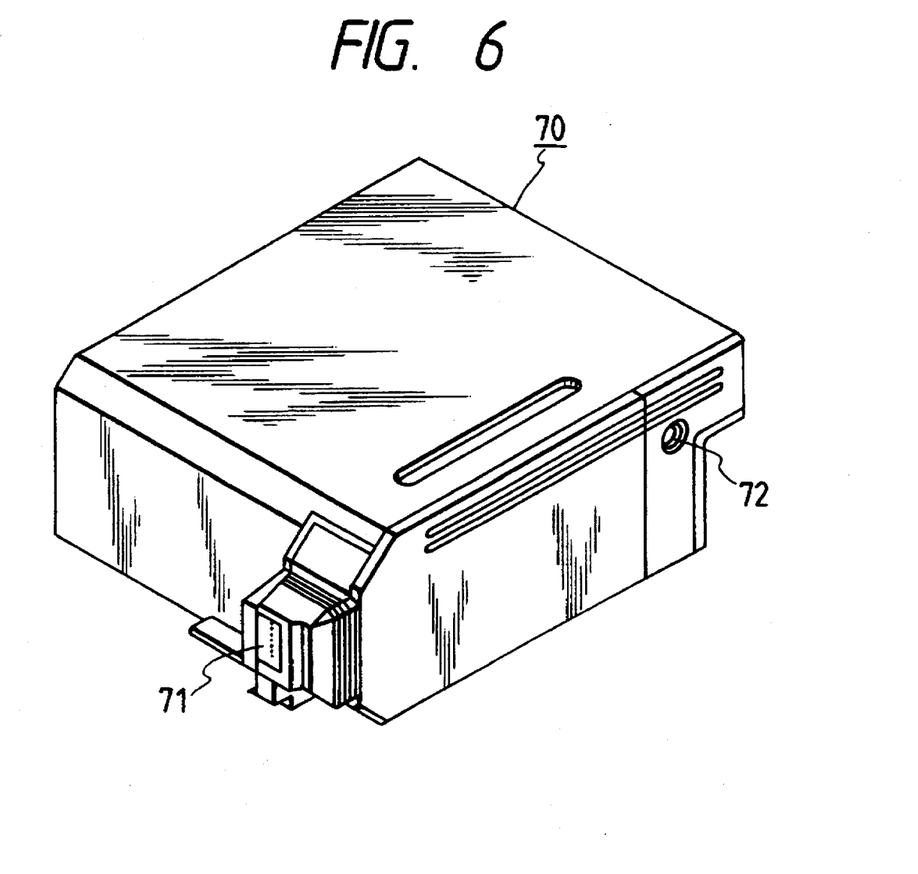
FIG. 6 is a perspective illustration of a recording unit.

In FIG. 6, reference numeral 70 denotes a recording unit, in the interior of which an ink absorber that has held an ink is contained. The recording unit is so constructed that the ink in such an ink absorber is ejected in the form of ink droplets from a head 71 having a plurality of orifices. As a material for the ink absorber, it is preferable in the present invention to use polyurethane, cellulose or polyvinyl acetal. Reference numeral 72 denotes an air path opening through which the interior of the cartridge is made to communicate with the atmosphere. This recording unit 70 can be used in place of the recording head shown in FIG. 4, and is detachably mounted to the carriage 66.

To constitute the head in the working of the present invention, when the system in which the liquid composition is ejected by the ink-jet head, ink ejecting heads may be arranged in parallel in the direction of movement of the carriage, i.e., the scanning direction on the recording medium, or in vertically in the direction perpendicular thereto. When arranged in vertically, nozzles of one head may be divided into an upper half and a lower half so that the inks and the liquid composition can be fed through separated flow paths. Of course, the heads may also be so constituted that the order to eject the liquid composition and the inks is in reverse.

The present invention invention will be described below in greater detail by giving Examples and Comparative Examples.

EXAMPLES 1 to 24

The components as shown in Table 1 were mixed and dissolved, followed by filtration under pressure using a membrane filter (trade name: FLUOROPORE FILTER; available from Sumitomo Electric Industries, Ltd.) with a pore size of 0.22 µm to obtain liquid compositions M-1 to M-4.

TABLE 1

| | Cationic low-molecular compound | | Cationic high-molecular compound | | Organic solvent | | Water |
|---|---|---|---|---|---|---|---|
| M-1 | None | | PAA-HCL-3L | (3*) | DEG (10*) | | 87* |
| M-2 | BTBAC | (3*) | PAA-HCL-3L | (3*) | DEG (10*) | | 84* |
| M-3 | G-50 | (2*) | PAS-A-5 | (5*) | DEG (10*) | | 83* |
| M-4 | G-50 | (2*) | SANFLOCK 700 | (5*) | DEG (10*) | | 83* |

*parts by weight

In the table, abbreviations or trade names stand for the compounds shown below.

PAA-HCL-3L: Polyallylamine hydrochloride
  (molecular weight: 10,000; available from Nitto Boseki Co., Ltd.)
PAS-A-5: Polyamine sulfone hydrochloride
  (molecular weight: 3,500; available from Nitto Boseki Co., Ltd.)
BTBAC: Benzyltributylammonium chloride
  (available from Tokyo Kasei Co., Ltd.)
G-50: Benzalkonium chloride
  (available from Sanyo Chemical Industries, Ltd.)
SANFLOCK:
  (trade name;
    available from Sanyo Chemical Industries, Ltd.)
DEG: Diethylene glycol Next, the colorant components of inks and anionic surface active agent as shown in Table 2, DEG (10 parts by weight) and water (the balance up to 100 parts) were mixed, followed by filtration under pressure using a membrane filter (trade name: FLUOROPORE FILTER; available from Sumitomo Electric Industries, Ltd.) with a pore size of 0.22 μm to obtain ink combinations I-1 to I-5.

TABLE 2

| | Yellow dye (Anionic surfactant) | | Magenta dye (Anionic surfactant) | | Magenta dye (Anionic surfactant) | |
|---|---|---|---|---|---|---|
| I-1 | AY-23 | (1.5*) | AR-52 | (2.5*) | DBL-199 | (3.0*) |
| I-2 | DY-142 | (1.5*) | AR-289 | (2.5*) | DBL-199 | (2.8*) |
| | | | | | AB-9 | (0.7*) |
| I-3 | AY-23 | (1.5*) | AR-52 | (2.5*) | DBL-199 | (3.0*) |
| | | | | | (SLS-30) | (1.0*) |
| I-4 | DY-86 | (2.5*) | AR-133 | (2.5*) | DBL-199 | (3.0*) |
| | (SSS) | (0.5*) | | | (SSS) | (0.5*) |
| I-5 | DY-86 | (2.5*) | AR-92 | (2.5*) | DBL-199 | (3.0*) |
| | (SUNDET EN) | | (SUNDET EN) | | (SUNDET EN) | |
| | | (1.0*) | | (1.0*) | | (1.0*) |

*parts by weight

In the table, abbreviations or trade names stand for the compounds shown below.

SLS-30: Sodium lauryl sulfate
  (available from Nikko Chemicals Co., Ltd.)
SSS: Sodium stearate
  (available from Nikko Chemicals Co., Ltd.)
SUNDET EN: Polyoxyethylene lauryl ether sodium sulfate
  (available from Sanyo Chemical Industries, Ltd.)
AY: C.I. Acid Yellow
AR: C.I. Acid Red
DY: C.I. Direct Yellow
DBL: C.I. Direct Blue
AB: C.I. Acid Blue Next, using the liquid composition and inks obtained in the above manner, records were made on commercially available copy paper. As an ink-jet recording apparatus used, the same recording apparatus as shown in FIG. 4 was used, and its head was so constructed that heads for ejecting inks and liquid compositions were arranged in parallel in the direction of movement of the carriage and the inks are always shot later for recording. The recording heads used here had a recording density of 360 dpi and were driven under conditions of a drive frequency of 5 kHz. Their ejection volume per dot was 55 pl. These recording conditions were constant throughout the Examples of the present invention and the Comparative Example. Printing tests were made under uniform environmental conditions of 25° C./55% RH.

Recorded images were evaluated in the following way.

(1) Image density:

Black solid print samples were formed using the liquid composition and cyan, magenta and yellow inks, and their reflection densities were measured after leaving them for 12 hours, using a reflection densitometer MACBETH RD915 (manufactured by Macbeth Co.). Evaluation was made according to the following criteria.

AA: Reflection density is 1.25 or higher.
A: Reflection density is from 1.20 to 1.24.
B: Reflection density is from 1.10 to 1.19.
C: Reflection density is 1.09 or lower.

(2) Fixing performance:

Process-black solid print samples were formed using the liquid composition and cyan, magenta and yellow inks. After the samples were formed, the time by which no images became smeared any longer even when the printed areas were rubbed with fingers was measured. Evaluation was made according to the following criteria.

AA: Fixed in 10 seconds.
A: Fixed in from 11 to 20 seconds.
B: Fixed in from 21 to 30 seconds.
C: Fixed after 30 seconds.

(3) Character quality level:

Alphanumerics in the above process black were printed, and the prints were visually evaluated. Those with no conspicuous feathering were evaluated as "A", and those with a level lower than that, as "C".

(4) Water resistance:

Samples obtained in the test (1) were left to stand for 30 minutes, and thereafter dipped for 3 seconds in 20° C. tap water to visually evaluate the retention of prints. Prints with no smearing at all were evaluated as "A", and those with a level lower than that, as "C".

(5) Color tone:

Solid print samples in the above process black were formed to make visual evaluation. Prints with a good tone as black color were evaluated as "A", and the those with reddish tone, as "C".

Throughout the Examples of the present invention and the Comparative Example, the area on which the liquid composition adheres to the recording medium is the same area as the area on which images are formed with ink, printing duty is 100%, and also the printing direction for the liquid composition and all the inks is one side and the liquid composition is always shot before the inks.

In Examples, the ink shot quantities of the three color inks are relatively changed by decreasing the ink shot duty of magenta ink or by increasing the ink ejection quantity of cyan ink or yellow ink or the both of them. The ink shot quantities were adjusted by adjusting the widths of pulses the recording heads impart to the heater.

Combinations of the liquid composition and inks as used in Examples are shown in Tables 3 and 4. Results of the evaluation on items (1) to (5) are also shown together in Tables 3 and 4.

TABLE 3

| Exam- | | | Ink shot | | | | | CIE L*a*b* | | |
|---|---|---|---|---|---|---|---|---|---|---|
| ple: | I- | M- | mode (1) | (2) | (3) | (4) | (5) | L* | a* | b* |
| 1 | 1 | 1 | (B) A | A | A | A | A | 28, | 5.1, | −4.5 |
| 2 | 1 | 2 | (B) AA | AA | A | A | A | 26, | 4.8, | −5.0 |
| 3 | 1 | 3 | (B) AA | AA | A | A | A | 25, | 4.6, | −4.7 |
| 4 | 1 | 4 | (B) AA | AA | A | A | A | 26, | 4.5, | −4.8 |
| 5 | 2 | 1 | (C) A | A | A | A | A | 25, | 5.0, | −7.9 |
| 6 | 2 | 2 | (C) AA | AA | A | A | A | 25, | 4.8, | −8.0 |
| 7 | 2 | 3 | (C) AA | AA | A | A | A | 24, | 4.7, | −8.1 |
| 8 | 2 | 4 | (C) AA | AA | A | A | A | 24, | 4.7, | −7.9 |
| 9 | 3 | 1 | (A) A | A | A | A | A | 25, | 4.8, | −6.0 |
| 10 | 3 | 2 | (A) AA | AA | A | A | A | 23, | 4.7, | −5.8 |
| 11 | 3 | 3 | (A) AA | AA | A | A | A | 24, | 4.8, | −5.5 |
| 12 | 3 | 4 | (A) AA | AA | A | A | A | 23, | 5.0, | −5.9 |

TABLE 4

| Exam- | | | Ink shot | | | | | CIE L*a*b* | | |
|---|---|---|---|---|---|---|---|---|---|---|
| ple: | I- | M- | mode (1) | (2) | (3) | (4) | (5) | L* | a* | b* |
| 13 | 4 | 1 | (A) A | A | A | A | A | 27, | 4.3, | −4.0 |
| 14 | 4 | 2 | (A) AA | AA | A | A | A | 25, | 4.9, | −4.5 |
| 15 | 4 | 3 | (A) AA | AA | A | A | A | 25, | 4.5, | −4.1 |
| 16 | 4 | 4 | (A) AA | AA | A | A | A | 25, | 4.6, | −4.3 |
| 17 | 4 | 1 | (C) A | A | A | A | A | 25, | 5.0, | −8.9 |
| 18 | 4 | 2 | (C) AA | AA | A | A | A | 23, | 5.1, | −8.0 |
| 19 | 4 | 3 | (C) AA | AA | A | A | A | 23, | 5.2, | −8.5 |
| 20 | 4 | 4 | (C) AA | AA | A | A | A | 23, | 4.8, | −8.2 |
| 21 | 5 | 1 | (A) A | A | A | A | A | 26, | 5.0, | −5.0 |
| 22 | 5 | 2 | (A) AA | AA | A | A | A | 25, | 4.9, | −5.5 |
| 23 | 5 | 3 | (A) AA | AA | A | A | A | 23, | 4.8, | −5.1 |
| 24 | 5 | 4 | (A) AA | AA | A | A | A | 23, | 5.0, | −5.2 |

The symbols for the ink shot mode as used in Tables 3 and 4 indicate the following.

(A): Process black prints are formed at each 100% duty for the three inks, yellow ink, cyan ink and magenta ink.

(B): When process black prints are formed, the magenta ink shot duty is controlled to be 70% of the ink shot duties of other two color inks.

(C): The quantity of yellow ink and magenta ink each ejected when process black prints are formed is increased by 20% with respect to that of magenta ink.

In the above Examples, the process black solid prints showed a high density and also a good color tone.

Comparative Example 1

Printing tests were carried out in the same manner as in the Examples except that the ink composition I-5 was used and no liquid composition was used, and evaluation was made in entirely the same manner as in the Examples. The results obtained are shown below.

TABLE 5

| Comparative | | Ink shot | | | | | CIE L*a*b* | | |
|---|---|---|---|---|---|---|---|---|---|
| Example: | I- | mode (1) | (2) | (3) | (4) | (5) | L* | a* | b* |
| 1 | 5 | (A) B | C | A | C | C | 28, | 10, | 0.5 |

In the above Comparative Example, prints samples showed a low density, and the process black solid print samples were undesirably reddish.

As described above, the present invention makes it possible to obtain prints having a good color tone and a high image density at black image portions and having a good character quality level and a perfect water resistance.

What is claimed is:

1. An ink set comprising a combination of a liquid composition comprising a low-molecular weight cationic substance and a high-molecular weight cationic substance in combination, with a yellow ink, a cyan ink and a magenta ink, wherein said three inks each contain a water-soluble anionic dye and are capable of affording a chromaticity CIE L*a*b* to a black image presented on a recording medium by using these inks in combination within the range of the numerical expressions:

$$10 \leq L^* \leq 30,$$

$$0 \leq a^* \leq 7,$$

and $$-10 \leq b^* \leq 0.$$

2. The ink set according to claim 1, wherein said anionic dye is any one of an acid dye, a direct dye and a reactive dye.

3. The ink set according to claim 1, wherein said anionic dye is contained in each of said inks in an amount of from 0.1% by weight to 15% by weight based on the total weight of the ink.

4. The ink set according to claim 1, wherein said liquid composition comprises a cationic substance with a molecular weight of 1,000 or less and a cationic substance with a molecular weight of 1,500 or more in combination.

5. The ink set according to claim 1, wherein said low-molecular weight cationic substance has a molecular weight ranging from 100 to 700.

6. The ink set according to claim 1, wherein said high-molecular weight cationic substance has a molecular weight ranging from 1,500 to 10,000.

7. The ink set according to claim 1, wherein said each ink further contains water and a water-soluble organic solvent.

8. The ink set according to claim 1, wherein said liquid composition further contains water and a water-soluble organic solvent.

9. The ink set according to claim 1, wherein said each ink contains water in an amount ranging from 10% by weight to 97.5% by weight based on the total weight of the ink.

10. The ink set according to claim 1, wherein said each ink contains a water-soluble organic solvent in an amount ranging from 2% by weight to 80% by weight based on the total weight of the ink.

11. The ink set according to claim 1, wherein said each ink has a viscosity at 25° C. in the range of from 1 cP to 20 cP.

12. The ink set according to claim 1, wherein said each ink has a surface tension of 30 dyne/cm or above.

13. The ink set according to claim 1, wherein said each ink has a pH value ranging from 6 to 10.

14. The ink set according to claim 1, wherein said yellow ink or cyan ink comprises further an anionic surface active agent or an anionic high-molecular weight substance other than the dye.

15. The ink set according to claim 1, wherein said magenta ink contains a dye represented by the formula:

wherein $R_1$ and $R_2$ each represent H, $CH_3$, $OCH_3$, $-SO_3M$ or $-COOM$, and $R_3$ is $-COCH_3$, wherein $R_4$ and $R_5$ each represent $-COOM$, $R_6$ or $-OR_6$, where $R_6$ represents a $C_2$ to $C_6$ alkyl chain which may be branched; and M represents sodium, lithium, an organic amine or ammonium.

16. An image forming method comprising forming a black portion by using a liquid composition comprising a low-molecular weight cationic substance and a high-molecular weight cationic substance, in combination with a yellow ink, a cyan ink and a magenta ink, wherein said three inks each contain a water-soluble anionic dye and are capable of affording a chromaticity CIE L*a*b* to a black image presented on a recording medium by using these inks in combination within the range of the numerical expressions:

$10 \leq L^* \leq 30$, $0 \leq a^* \leq 7$, and $-10 \leq b^* \leq 0$.

17. An image forming method comprising imparting a liquid composition, a yellow ink, a cyan ink and a magenta ink by an ink-jet system to record a black portion, wherein the ink set according to any one of claims 1–15 is applied.

18. The image method according to claim 17, wherein said ink-jet system is a system comprising applying a heat energy to the ink to generate ink droplets.

19. The image forming method according to claim 17, wherein said yellow ink and cyan ink are each imparted to the recording medium in a quantity larger by 10% to 50% with respect to that of said magenta ink.

20. The image forming method according to claim 17, wherein the ink shot duty of said magenta ink is controlled within the range of from 50% to 80% of that of said yellow ink and cyan ink each.

21. A recording unit comprising holders for a liquid composition and an ink and a head that ejects the liquid composition and the ink in the form of droplets, wherein the ink set according to any one of claims 1–15 is applied.

22. The recording unit according to claim 21, wherein an ink-jet system that generates ink droplets by the action of heat energy is applied to said head.

23. An ink cartridge comprising holders for a liquid composition and an ink, wherein the ink set according to any one of claims 1–15 is applied.

24. An ink-jet recording apparatus comprising the recording unit according to claim 21.

25. An ink-jet recording apparatus comprising the recording unit according to claim 22.

26. An ink-jet recording apparatus comprising the ink cartridge according to claim 23.

27. The ink-jet recording apparatus according to claim 23, having a head for generating ink droplets by an ink-jet system.

28. An ink-jet recording apparatus comprising the ink set according to any one of claims 1–15.

29. The ink-jet recording apparatus according to claim 28, further having a head for generating ink droplets by an ink-jet system.

30. An image which is presented using a liquid composition comprising a low-molecular weight cationic substance and a high-molecular weight cationic substance, in combination with a yellow ink, a cyan ink and a magenta ink, and contains a black portion having on a recording medium a chromaticity CIE L*a*b* within the range of the following numerical expressions:

$10 \leq L^* \leq 30$, $0 \leq a^* \leq 7$, and $-10 \leq b^* \leq 0$.

* * * * *

UNITED STATES PATENT AND TRADEMARK OFFICE
CERTIFICATE OF CORRECTION

PATENT NO. : 5,700,314
DATED : December 23, 1997
INVENTOR(S) : YUTAKA KURABAYASHI, ET AL.

It is certified that error appears in the above-identified patent and that said Letters Patent is hereby corrected as shown below:

ON THE COVER PAGE:

Item [19] "Kurbayashi" should read --Kurabayashi--.

Item [75] <u>Inventors:</u>

Line 1, "Kurbayashi" should read --Kurabayashi--.

COLUMN 2:

Line 58, "wherein;" should read --wherein:--.

COLUMN 10:

Line 41, "other" should read --the other--.

COLUMN 11:

Line 40, "to the" should read --the--.
Line 54, "opposing to" should read --opposite--.

UNITED STATES PATENT AND TRADEMARK OFFICE
CERTIFICATE OF CORRECTION

PATENT NO. : 5,700,314
DATED : December 23, 1997
INVENTOR(S) : YUTAKA KURABAYASHI, ET AL.

It is certified that error appears in the above-identified patent and that said Letters Patent is hereby corrected as shown below:

COLUMN 12:

Line 48, "or in" should read --or--.
Line 49, "in" should be deleted.
Line 55, "invention" (second occurrence) should be deleted.

COLUMN 15:

Line 4, "the" should be deleted--.
Line 13, "Examples," should read --the Examples,--.
Line 20, "Examples" should read --the Examples--.
Line 21, "on" should read --of--.
Line 64, "other" should read --the other--.

COLUMN 16:

Line 19, "prints" should read --print--.

Signed and Sealed this

Sixteenth Day of June, 1998

Attest:

BRUCE LEHMAN

Attesting Officer        Commissioner of Patents and Trademarks